United States Patent [19]

DeRosa et al.

[11] Patent Number: 4,596,461
[45] Date of Patent: Jun. 24, 1986

[54] IN-LINE, CONCURRENT ELECTROMAGNETIC BEAM ANALYZER

[75] Inventors: John L. DeRosa, Upper Marlboro, Md.; Terence J. Wieting, Springfield, Va.

[73] Assignee: The United States of America as represented by the Secretary of the Navy, Washington, D.C.

[21] Appl. No.: 580,921

[22] Filed: Feb. 16, 1984

[51] Int. Cl.⁴ ............................................. C01J 1/00
[52] U.S. Cl. .................................... 356/121; 374/137
[58] Field of Search ....................... 356/121; 372/99; 350/607, 609, 611; 219/121 LZ; 374/137, 17, 18, 19, 20

[56] References Cited

U.S. PATENT DOCUMENTS

| | | | |
|---|---|---|---|
| 3,399,568 | 9/1968 | Wilson | 374/137 |
| 4,190,327 | 2/1980 | Hughes | 350/610 |
| 4,422,725 | 12/1983 | Prewo | 350/607 |

Primary Examiner—R. A. Rosenberger
Attorney, Agent, or Firm—Robert F. Beers; Sol Sheinbein; Barry A. Edelberg

[57] ABSTRACT

An in-line concurrent diagnostic analyzer for laser beams. An aperature mirror splits the initial laser beam into two beams. The reflected portion of the initial beam follows path 1. Along path 1, an aliquot of the path 1 beam is reflected into a time history sensor. The majority of the path 1 beam ignites a plasma to mark beam arrival time at the target. The aperatured beam strikes and heats a calorimeter mirror, which records the energy of the incident beam. About 99 percent of the aperatured beam then passes to a specially designed (thin, with a short diffusion time) mirror attached to thermocouples to record the energy profile of the beam. The beam is reflected by the special mirror onto the target. A Third sensor detects any breakdown at the target surface.

13 Claims, 3 Drawing Figures

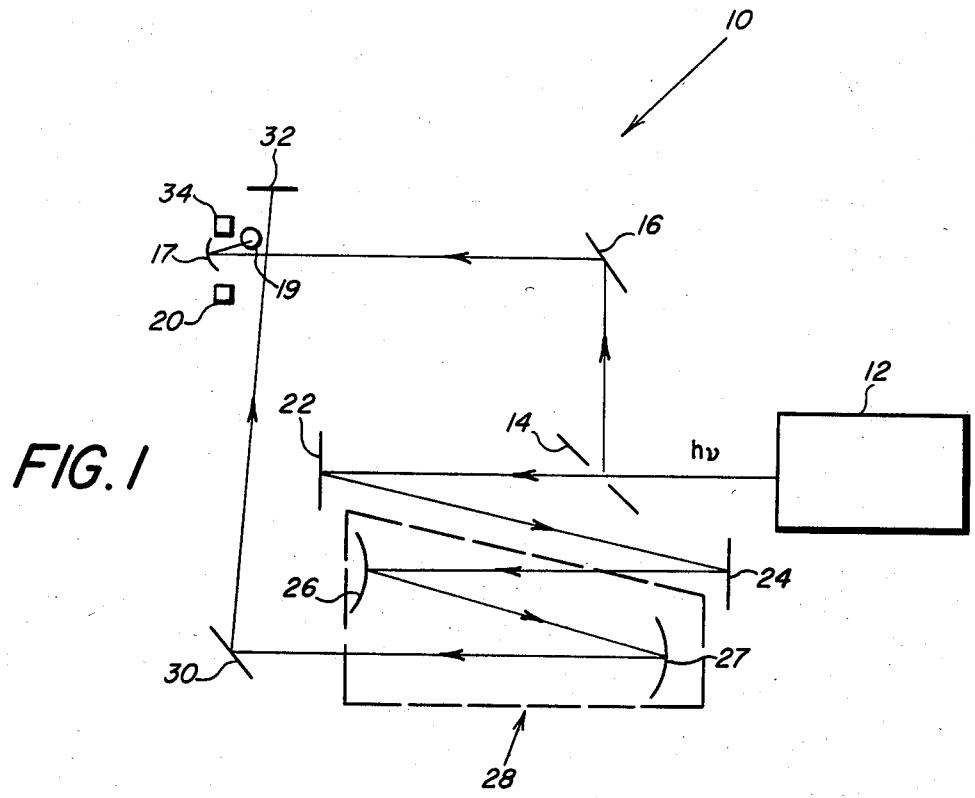
FIG. 1
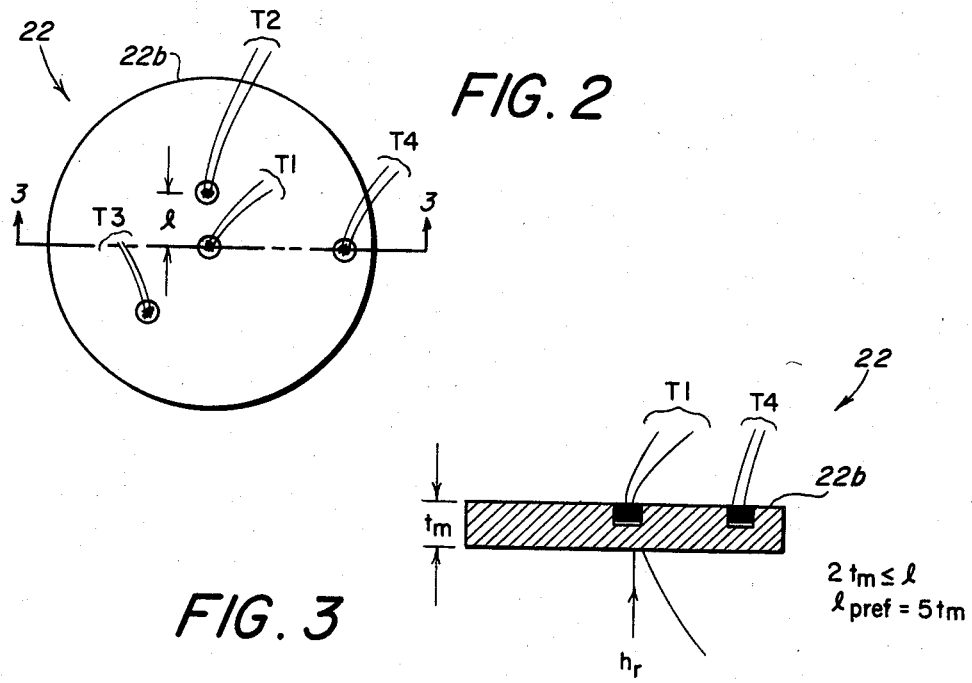
FIG. 2
FIG. 3
$2\, t_m \leq \ell$
$\ell\, \text{pref} = 5\, t_m$

IN-LINE, CONCURRENT ELECTROMAGNETIC BEAM ANALYZER

FIELD OF THE INVENTION

This invention relates generally to electromagnetic radiation technology and more specifically to electromagnetic beam diagnostics.

BACKGROUND OF THE INVENTION

Effective use of both continuous wave (CW) and pulsed directed electromagnetic beam devices (most notably lasers) requires diagnostic information on the beam. Valuable information typically includes the spatial profile, total energy, beam arrival time, duration of exposure, and the variation of these physical parameters throughout an irradiation experiment or use.

Previously, several methods have been used to supply diagnostic information on laser beams. In one method, a plexiglass plate is placed in the target position and irradiated. The mass removed by vaporization is directly proportional to the incident laser energy; the shape of the burn pattern or crater is analyzed to obtain both the spatial distribution and peak-to-average intensity ratio. The disadvantages inherent in this method are non-concurrence with target testing (laser parameters can and often do vary widely and unpredictably during an experiment), high cost, and questionable accuracy and usefulness for pulsed lasers. In another method, laser radiation is directed into a calorimeter to obtain the total energy of the beam. Calorimeters are used to calibrate plexiglass data as well as scanner data. In the CW case the whole beam is directed into the calorimeter; in the pulsed case only part of the beam is directed into the calorimeter. The disadvantages of that method include nonconcurrency with target testing when the whole beam is used, high cost, and only partial use of the beam in some applications. Another method employs scanners. These devices view the front surface of a mirror. The scanner detector records the diffusely scattered light from the spot. These scanners are used to obtain the spatial distribution of the radiation on a target. The disadvantages of that method include non-concurrency with target testing, complex instrumentation and long set-up times, incompatibility with pulsed lasers because the scan rate is not fast enough, cost and the crucial dependency of the devices on the surface condition of the mirrors.

OBJECTS OF THE INVENTION

It is an object of this invention to provide inexpensive diagnostic information on electromagnetic beams.

It is another object of this invention to provide concurrent, in-line, whole-beam, non-interfering diagnostic information on CW and pulsed beams.

It is a further object of this invention to obtain for a laser beam, the spatial profile, total energy, beam arrival time, duration of exposure and the variation of these physical parameters throughout an experiment.

SUMMARY OF THE INVENTION

These and other objects are achieved by an in-line concurrent diagnostic analyzer for electromagnetic beams. The analyzer employs a plasma vaporizing block, a plasma detector, an ignition sensor, a light sensor, a calorimeter mirror having at least one thermocouple on its rear surface, and a spatial distribution mirror having a plurality of thermocouples placed on its rear surface so that the distance between all adjacent thermocouples is at least about twice the thickness of the mirror. The design of the spatial distribution mirror and the arrangement of the thermocouples on its rear surface together constitute a major element of this invention.

BRIEF DESCRIPTION OF THE DRAWING

The exact nature of this invention as well as other objects and advantages thereof will be readily apparent from consideration of the following specification and drawing.

FIG. 1 is a schematic diagram of an on-line beam analyzer in accordance with a preferred embodiment of this invention.

FIG. 2 is a plan view of a spatial distribution mirror of a construction that is in accordance with a preferred embodiment of this invention.

FIG. 3 is a sectional view of the FIG. 2 mirror, taken along section line 3—3 of FIG. 2.

DETAILED DESCRIPTION OF THE PREFERRED EMBODIMENTS

The drawing shows a schematic diagram of a preferred embodiment of the invention. A beam emitted by directed electromagnetic beam device 12 (preferably a laser) travels to aperture mirror 14, which apertures the beam to define the cross-section of the beam. The front surface of the aperture mirror is highly polished, and portions of the beam which do not pass through the aperture are redirected. The redirected beam travels to turning flat 16 and is focused by mirror 17 onto plasma vaporizing block 19 causing plasma ignition. Plasma vaporizing block 19 may be made of a roughened metal (e.g. steel or aluminum) but is preferably carbon. Ignition sensor 20 detects the ignition and sends a signal to readout instrumentation (not shown), thus indicating on/off time (CW lasers), or pulse arrival and count (pulse lasers). Optionally, a small mirror (not shown) may be placed in the path of the redirected beam, causing a portion of the redirected beam to strike a light sensor (not shown), thus allowing recordation of the time history of the pulse.

The apertured beam continues to spatial distribution mirror 22 shown in FIGS. 1–3. Spatial distribution mirror 22 has, on its rear surface 22b, an array of thermocouples (T1, T2, T3, T4). The thermocouples, must be arranged so that the distance 1 between the thermocouples is at least about twice and preferably about five times the thickness $t_m$ of spatial distribution mirror 22. Thus $2\ t_m \leq 1$ and 1 pref=$5t_m$. Otherwise, the thermocouples average the heat input to the mirror and the profile information is lost. Preferably, at least three thermocouples are used. The beam is then reflected to calorimeter mirror 24, where a thermocouple on the center of the rear surface of the mirror measures the energy content of the beam. The calorimeter mirror reflects this beam onto focusing mirror 26, which then focuses the beam onto focusing mirror 27. Focusing mirrors 26 and 27 are referred to collectively as telescope 28. After passing through telescope 28, the beam continues onto turning flat 30, which refects the beam onto target 32. Plasma detector 34 detects breakdown of the air near the surface of target 32.

The major purpose of plasma block 19 is to provide an indication of the beam arrival time at the sample plane 32. The plasma block 19, which can be any conducting material, provides a source of "seed" electrons to aid the split off and focused portion of the beam to ignite a plasma on its surface. When the plasma ignites, it provides a bright source of visible light which can than be read by a PIN diode or other similar detector 20. The signal from detector 20 is then put into the readout instrumentation.

Detector 34, also a PIN diode or other similar device, records plasma ignitions at the sample surface 32. Detector 34 is visually shielded from block 19 so it will only see plasma ignitions at the sample plane 32. Correspondingly, detector 20 is visually shielded from the light emissions occuring at the sample 32.

The mirror 17, plasma vaporizing block 19, and ignition sensor 20 need not be placed near the sample plane 32. This configuration provides simultaneous photographic coverage of both block 19 and spatial distribution mirror 32, which is part of the data which is recorded.

The calorimeter mirror is typically made of a metal, preferably polished copper or molybdenum, and most preferably polished copper. Preferably, the mirror should absorb as little energy as possible. Typically, greater than about 98% and most preferably greater than about 99% of incoming energy should be reflected by the mirror. For low power applications, the reflectivity may be far less. The small fraction of the beam energy absorbed (usually less than about 1%) heats up the mirror, and one or more thermocouples on the rear surface monitors the rise an temperature. Preferably, two thermocouples are employed. One is placed in the center of the mirror. A second thermocouple, at the edge of the mirror, is then used to establish that the mirror has equilibrated and that accurate calorimetry measurements may then be obtained. Knowing the exposure time ($t_e$) and the reflectivity and heat capacity of the mirror permits the total energy of the incident beam to be calculated by the second law of thermodynamics.

The thickness of the spatial distribution mirror determines the spacing of the thermocouples which in turn determines the resolution of the beam profile. The distance between any one thermocouple and its nearest neighbor must be equal to at least twice the mirror thickness; otherwise, the thermocouples will not read the temperatures of the front surface directly opposite them, but will begin to average the heat input to the mirror. In early time during the exposure, which is defined as the diffusion time ($t_d$) for the heat to travel from the front to the back surface, the spatial distribution mirror measures the beam profile. In late time ($t \geq t_e + t_d$) the spatial distribution mirror provides a second measurement of the total energy of the beam. Although one properly designed mirror could yield both the spatial profile and, in late time, total energy, there is some merit (better resolution) in dedicating each mirror to one measurement only (total energy or spatial profile). An additional design requirement for the spatial distribution mirror is that the diffusion time $t_d$ must be less than the "off-time" of the laser between bursts of radiation, if the spatial distribution for each burst is to be obtained. If the physical space at a laser facility or laboratory permits enlarging (and then reducing) the beam cross section by conventional telescoping, increased resolution in the spatial distribution measurement can be achieved. The resolution is enhanced by making the spatial distribution mirror thinner and its diameter larger. A thinner mirror will also reduce the response time ($t_d$) to a repetitively pulsed beam and provide time-resolved information on the spatial profile from pulse to pulse. The reflectivity requirements of the spatial distribution mirror are the same as those for the calorimeter mirror. Likewise, the spatial distribution mirror is preferably made of polished copper or molybdenum and is most preferably made of polished copper.

To minimize heat losses, the mirrors should be mounted on three point contacts and the beam should flood the surface of the calorimeter mirror. That is, the diameter of the beam should approximate the diameter of the calorimeter mirror as closely as possible. Masking tape may be placed around the edge of the mirror to check for spillage of the beam over the mirror's edge. To minimize radiative losses, the mirrors are best designed so that only a small temperature rise, preferably about 10° C., occurs on each run.

Ordinarily, because of the high speed of light compared to the time between laser pulses (typically greater than about 1 millisecond), and because of the quick response of a PIN diode detector (about 1 microsecond or less), the difference in path lengths between the path of the redirected and apertured beam does not significantly affect the accuracy of the time history and pulse count measurements.

Light sensors for similar diagnostic functions, i.e., time-history and plasma ignition at the target, are already known to those skilled in the art. The sensor marking the arrival time of the beam by detecting the ignition of the plasma vaporizing block is preferably a PIN diode with a response time of about 1 microsecond or less. Preferably, chromel/alumel thermocouples are used on the rear surfaces of the calorimeter and spatial distribution mirror. The thermocouples are preferably attached to the mirrors by an intrinsic junction. Any recordation or calibration equipment typically used in laser diagnostics, e.g., an oscilloscope, a visicorder, a calibration circuit or a computerized data acquisition system, may be used with the system of this invention.

The proper parameters (reflectivity, thickness, diameter, and thermocouple placement) for the spatial distribution mirror and the calorimeter mirror are dependent upon the ranges of laser intensity, beam width, pulse time, and the time between laser pulses for which the invention is specifically intended. Using the information in this description, and a basic knowledge of lasers and thermodynamics, one skilled in the art should be capable of selecting proper mirror parameters without undue experimentation.

An alternative method of fabricating the calorimeter and spatial distribution mirrors is to evaporate or plate a thin metallic coating on a dielectric substrate. Thermocouples are then inserted from the back through the dielectric substrate so that only the tips contact the metallic overlay. The substrate provides a mechanically rigid support for the thin metallic overlay in order to maintain an acceptable optical figure for the mirror. This technique should greatly increase the sensitivity of the mirrors to low power (below about 10 W average power) laser radiation.

EXAMPLE

Having described the invention in general, the following example is being given to illustrate the principles of the invention and is not intended to limit the scope of the invention in any manner.

A beam from a high power (greater than 1 KW average power) repetititve pulse laser source emitting pulses separated by 0.01 s was analyzed. Apparatus similar to that shown in the drawing and described in the accompanying description was used, with the exception that a separate calorimeter mirror was not employed. The spatial distribution mirror was used to obtain both beam profile, and in late time, total beam energy. The mirror, made of polished copper, was 11.4 cm in diameter and 0.58 cm thick. Four chromel/alumel thermocouples were attached to the mirror by an intrinsic junction at distances from the center of the mirror of 0 cm, 2.22 cm, 4.45 cm, and 5.24 cm. The beam profile was obtained between 7 and 110 laser beam pulses. The normalized profile was found to correlate well with profiles obtained by other means. After 110 pulses, the total beam energy was obtained. Peak intensity was found to be 4.25 $J/cm^2$; average intensity was found to be 3.73 $J/cm^2$. These measurements also correlated well with those obtained by other means.

Obviously many modifications and variations of the present invention are possible in light of the above teachings. For example, a source of directed electromagnetic energy other than a laser may be used. Indeed, such electromagnetic energy need not be coherent. It is therefore to be understood that, within the scope of the appended claims, the invention may be practiced otherwise than as specifically described.

What is claimed and desired to be secured by Letters Patent of the United States is:

1. A spatial distribution mirror for use in obtaining the beam profile of a laser beam, the front surface of said spatial distribution mirror being reflective, the rear surface having attached to it a plurality of thermocouples arranged in an array so that the distance between any two thermocouples is at least about twice the thickness of said spatial distribution mirror.

2. The mirror of claim 1 wherein said mirror comprises copper or molybdenum.

3. The mirror of claim 2 wherein the rear surface of said mirror has attached to it at least 4 thermocouples.

4. The mirror of claim 3 wherein the distance between any two thermocouples is at least about five times the thickness of said mirror.

5. The mirror of claim 4 wherein said thermocouples comprise chromel/alumel.

6. An on-line laser beam analyzer for a system having a laser source and an irradiated target the components of which comprise:
   an aperture mirror;
   plasma vaporizing block;
   an ignition sensor;
   a plasma detector;
   a spatial distribution mirror, the front surface of which is reflective, the rear surface of which has attached to it a plurality of thermocouples arranged in an array so that the distance between any two thermocouples is at least about twice the thickness of said spatial distribution mirror;
   said components being arranged so that light emitted by said laser source is split by said aperture mirror to form a redirected beam and an aperture beam, said redirected beam strikes and ignites a plasma at said plasma vaporizing block, the ignition of which is sensed by said sensor, said apertured beam strikes said spatial distribution mirror and strikes said irradiated target after striking said spatial distribution mirror and being reflected therefrom, said plasma detector being in a position such that any plasma formation at the surface of said irradiated target is detected by said plasma detector.

7. The analyzer of claim 6 wherein said spatial distribution mirror comprises copper.

8. The analyzer of claim 7 wherein the rear surface of said spatial distribution mirror has attached to it at least 4 thermocouples.

9. The analyzer of claim 8 wherein the distance between any two thermocouples is at least about five times the thickness of said spatial distribution mirror.

10. The analyzer of claim 9 wherein said thermocouples comprise chromel/alumel.

11. The analyzer of claim 6 further comprising a calorimeter mirror, the rear surface of which has attached to it at least one thermocouple, said mirror being positioned so that light reflected from said spatial distribution calorimeter mirror strikes said calorimeter mirror and strikes said target after striking said calorimeter mirror and being reflected therefrom.

12. The analyzer of claim 6 further comprising a focusing mirror for directing said apertured beam toward said plasma vaporizing block.

13. A method of obtaining diagnostic information from a laser beam, the steps of which comprise:
   selecting a spatial distribution mirror, the front surface of which is reflective, the rear surface of which has attached a plurality of thermocouples arranged in an array so that the distance between any two thermocouples is at least about twice the thickness of said spatial distribution mirror;
   choosing a target;
   causing light emitted by a laser source to be split by an aperture mirror to form a redirected beam and an apertured beam;
   causing said redirected beam to strike and ignite a plasma vaporizing block;
   detecting the ignition of said plasma vaporizing block;
   causing said apertured beam to strike said spatial distribution mirror and be reflected therefrom;
   causing the light reflected by said spatial distribution mirror to strike said target.

* * * * *